United States Patent

Peschka et al.

[11] Patent Number: 5,115,768
[45] Date of Patent: May 26, 1992

[54] COMBUSTION ENGINE FOR HYDROGEN

[75] Inventors: Walter Peschka, Sindelfingen; Gottfried Schneider, Stuttgart, both of Fed. Rep. of Germany

[73] Assignee: Deutsche Forschungsanstalt fuer Luft-und Raumfahrt e.V., Fed. Rep. of Germany

[21] Appl. No.: 652,325

[22] Filed: Feb. 7, 1991

[30] Foreign Application Priority Data

Feb. 8, 1990 [DE] Fed. Rep. of Germany ....... 4003729

[51] Int. Cl.$^5$ ............................................. F02B 75/12
[52] U.S. Cl. ............................... 123/1 A; 123/59 BS; 123/289; 123/DIG. 12
[58] Field of Search ........... 123/1 A, 269, 289, 59 BS, 123/73 F, 65 S, 304, 527, DIG. 12

[56] References Cited

U.S. PATENT DOCUMENTS

| 4,069,794 | 1/1978 | Jordan | 123/59 BS |
| 4,367,698 | 1/1983 | Skala | 123/1 A |
| 4,478,180 | 10/1984 | Fujikawa et al. | 123/59 BS |
| 4,485,779 | 12/1984 | Spurk | 123/289 |
| 4,508,064 | 4/1985 | Watanabe | 123/DIG. 12 |

FOREIGN PATENT DOCUMENTS

| 568918 | 1/1933 | Fed. Rep. of Germany. |
| 724065 | 7/1942 | Fed. Rep. of Germany. |
| 851701 | 10/1952 | Fed. Rep. of Germany. |
| 2517066 | 10/1976 | Fed. Rep. of Germany ... 123/DIG. 12 |
| 2525547 | 12/1976 | Fed. Rep. of Germany ... 123/DIG. 12 |

OTHER PUBLICATIONS

Patent Abstracts of Japan, No. 54-52203, vol. 3, No. 76 (M-64), Jun. 29, 1979.
Patent Abstracts of Japan, No. 57-83626, vol. 6, No. 172 (M-154), Sep. 7, 1982.

*Primary Examiner*—David A. Okonsky
*Attorney, Agent, or Firm*—Barry R. Lipsitz

[57] ABSTRACT

In order to improve a combustion engine for hydrogen comprising a main piston which is displaceable in a main cylinder in a stroke direction between a top dead center, forming a minimum main cylinder chamber with the main cylinder, and a bottom dead center and hereby performs a suction stroke, a compression stroke, a displacement stroke and an exhaust stroke, such that the problems of early ignition are avoided without any internal mixture formation with late injection being required, it is recommended that an auxiliary piston and an auxiliary cylinder be provided for movement relative to one another so as to be in equal phase and synchronous with the main piston and the main cylinder, that the auxiliary piston and the auxiliary cylinder define with one another a cylinder chamber varying between a minimum cylinder chamber in the top dead center and a maximum cylinder chamber in the bottom dead center, that the minimum cylinder chamber communicate with the minimum main cylinder chamber via a passage and that the hydrogen be injected into the cylinder chamber during the course of the suction stroke.

13 Claims, 3 Drawing Sheets

COMBUSTION ENGINE FOR HYDROGEN

The invention relates to a combustion engine for hydrogen comprising a main piston displaceable in a main cylinder in a stroke direction between a top dead center, forming a minimum main cylinder chamber with the main cylinder, and a bottom dead center and hereby performing a suction stroke, a compression stroke, a displacement stroke and an exhaust stroke.

Combustion engines for hydrogen of this type are known. These can be operated in a number of different ways. A first possibility is the external mixture formation with hydrogen with which the hydrogen/air mixture is produced outside the cylinder chamber and this is then drawn in as in a normal internal combustion engine for fossil fuels.

Another possibility is the internal mixture formation which provides for injection of the hydrogen directly into the main cylinder chamber, a difference being made between an early injection, i.e. at the beginning of the compression stroke, and a late injection, i.e. injection substantially near to the end of the compression stroke.

In contrast to internal combustion engines for fossil fuels, in the case of combustion engines for hydrogen power losses result both with the external mixture formation with hydrogen and with the internal mixture formation with early injection in the range of full load due to uncontrolled early ignition since the hydrogen/air mixture is heated at hot parts of the engine and therefore ignites prematurely.

This uncontrolled early ignition can be avoided when using internal mixture formation with late injection of hydrogen since the ignitable hydrogen/air mixture does not result until towards the end of the compression stroke.

However, the internal mixture formation with late injection does have the disadvantage that is it very difficult to homogenize the mixture sufficiently for combustion and so local inhomogeneities constantly result and these lead to a high emission of nitrogen oxide. In addition, problems also occur, at the customary speeds of internal combustion engines, when trying to inject, distribute and ignite the required volume of hydrogen in the combustion chamber during the short time available. This requires, for example, in the initial load range .injection pressures in the order of 100 to 200 bars in view of the greater volume of hydrogen in comparison with fossil fuels having the same energy content.

The object underlying the invention is therefore to improve a combustion engine for hydrogen such that the problems of early ignition are avoided without any internal mixture formation with late injection being necessary.

This object is accomplished in accordance with the invention, for a combustion engine of the type described at the outset, in that an auxiliary piston and an auxiliary cylinder are provided for movement relative to one another so as to be in equal phase and synchronous with the main piston and the main cylinder, that the auxiliary piston and the auxiliary cylinder define with one another a cylinder chamber varying between a minimum cylinder chamber in the top dead center and a maximum cylinder chamber in the bottom dead center, that the minimum cylinder chamber communicates with the minimum main cylinder chamber via a passage and that the hydrogen is injected into the cylinder chamber during the course of the suction stroke.

The inventive solution has the advantage that due to injection of the hydrogen into the cylinder chamber during the suction stroke a relatively low pressure is first required for this injection and a relatively long time is available. In addition, the hydrogen is compressed in the cylinder chamber during the compression stroke and flows during this compression stroke through the passage into the main cylinder chamber, leading to turbulences in the main cylinder chamber due to flow through the passage and these turbulences ensure that the hydrogen is mixed well with the air. Furthermore, at the beginning of the compression stroke the hydrogen/air mixture in the main cylinder chamber is not yet ignitable and does not become ignitable until immediately prior to the top dead center being reached since it is not until this time that the hydrogen is more or less completely expelled from the cylinder chamber into the main cylinder chamber.

In this way, the inventive solution combines the advantages of the internal mixture formation with early injection, relating to the time available for injecting the hydrogen and the low pressures required, and the advantages of the internal mixture formation with late injection with a view to the fact that early ignition is avoided since the mixture in the main cylinder chamber does not become ignitable until more or less immediately prior to the top dead center being reached.

According to the invention, the main cylinder chamber and the cylinder chamber are separated in all stroke positions and connected via the passage.

Theoretically, the auxiliary cylinder and the auxiliary piston can be arranged independently of the main piston and main cylinder and a transfer passage provided between the two. It is, however, particularly advantageous for the passage to be at least partially formed by a gap between the auxiliary piston and the auxiliary cylinder. This means that due to the relative movement of auxiliary piston and auxiliary cylinder control of the transfer velocity from the cylinder chamber into the main cylinder chamber is possible, in addition.

This control possibility can be achieved particularly easily in that the smallest radial distance of the gap between the auxiliary piston and the auxiliary cylinder varies between the top dead center and the bottom dead center.

In the embodiments described thus far, the auxiliary cylinder and the auxiliary piston can, as already mentioned, be arranged independently of the main piston and main cylinder. It is, however, particularly advantageous for the auxiliary piston and the auxiliary cylinder to be displaced relative to one another in the stroke direction of the main piston, i.e. both move in the same direction as the main piston.

From a constructional point of view, the inventive combustion engine can be realized in a particularly simply manner by the auxiliary piston and the auxiliary cylinder travelling, relative to one another, along the same path as the main piston. Particularly in the latter case, the synchronous coupling of the movement of the auxiliary piston relative to the auxiliary cylinder with the main piston is achieved by coupling the displaceable auxiliary piston or auxiliary cylinder, respectively, with the main piston via a connecting member.

This connecting member can be of the most varied type and construction. For example, it is possible to provide a coupling rod as connecting member.

In the simplest case, however, the stationary auxiliary cylinder or auxiliary piston is rigidly connected to the main cylinder and the displaceable auxiliary piston or auxiliary cylinder is held on the main piston. In this case, the two movable parts are rigidly held on one another so that synchronous movement thereof is possible in the simplest manner.

In order to achieve compensation for play and, in particular, to ensure that the gap between auxiliary cylinder and auxiliary piston can readjust itself, the auxiliary piston or auxiliary cylinder, respectively, is held on the main piston with clearance transverse to the stroke direction so that the two movable parts can still, relative to one another, move transversely to the stroke direction to provide such compensation for play.

In the simplest case, the auxiliary piston extends beyond a base of the main piston.

In addition, in this case the auxiliary cylinder extends away from the minimum cylinder chamber.

Particularly when relative movement of the auxiliary cylinder and the auxiliary piston is intended to be in the stroke direction, the auxiliary cylinder extends in the stroke direction of the main piston and preferably forms an extension of the main cylinder.

Particularly advantageous is, in addition, an embodiment of the inventive combustion engine, in which this is provided with a main injection means opening into the main cylinder chamber and generating a weak operation during the suction stroke and in which for enriching the mixture an enriching injection means is provided in the cylinder chamber.

This has the advantage that the basic enrichment of the hydrogen/air mixture is carried out via the injection directly into the main cylinder chamber and so auxiliary cylinder and auxiliary piston can be of a very small construction as these merely have to perform an enriching injection and so the inventive combustion engine is, altogether, of a very small construction.

Additional features and advantages of the inventive solution are the subject matter of the following description as well as of the drawings of several embodiments. In these drawings.

Figure 1:
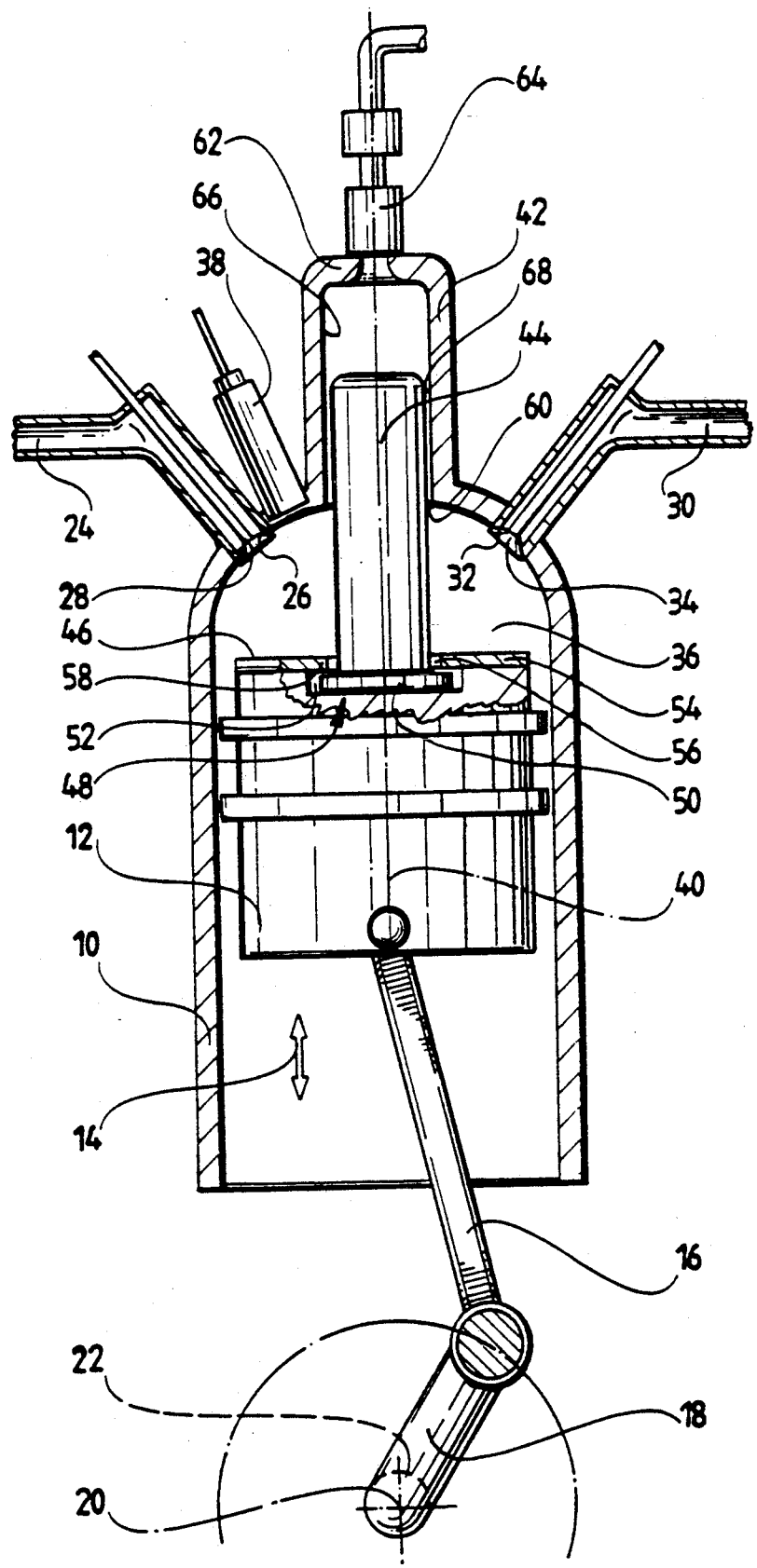
FIG. 1 shows a first embodiment illustrated schematically in cross section.
Figure 2:
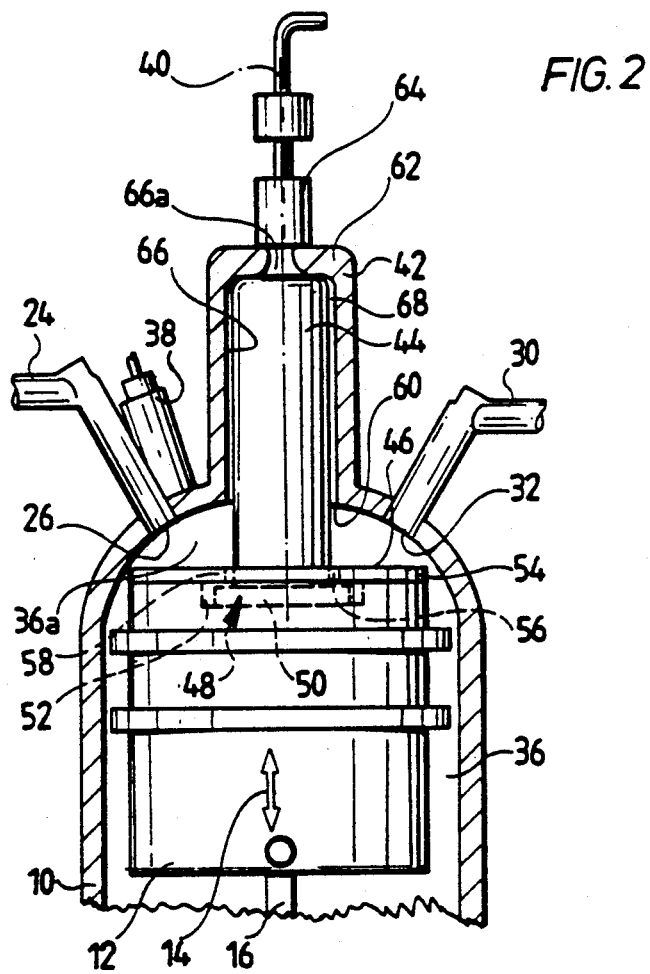
FIG. 2 is an illustration similar to FIG. 1 of the first embodiment in the top dead center.
Figure 3:
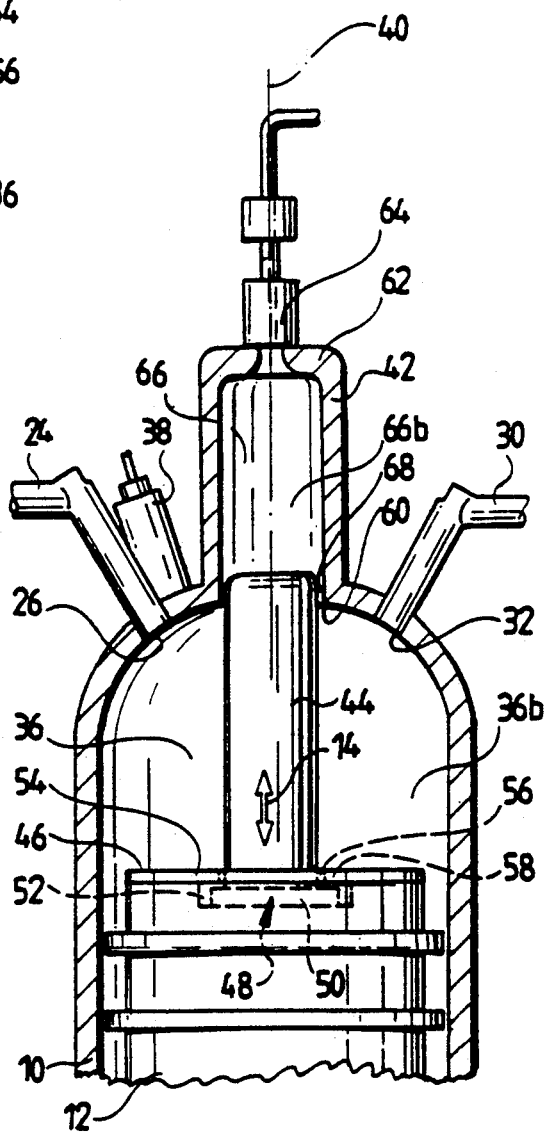
FIG. 3 is an illustration similar to FIG. 1 of the first embodiment in the bottom dead center and FIG. 4 is an illustration similar to FIG. 1 of a second embodiment.

A first embodiment of an inventive combustion engine for hydrogen, illustrated in FIG. 1, comprises a main cylinder 10 in which a main piston 12 is adapted for reciprocating movement in a stroke direction 14, between a top dead center illustrated in FIG. 2 and a bottom dead center illustrated in FIG. 3. The main piston 12 is connected by way of a piston rod 16 to a crankshaft 18 which, itself, rotates about an axis 20 of a driven shaft 22 of the combustion engine. An inlet passage 24 opens into the main cylinder 10 in an inlet opening 26 which is adapted to be closed by an inlet valve 28. In addition, an outlet passage 30 leads from the main cylinder 10, starting from an outlet opening 32 which is also adapted to be closed by an outlet valve 34.

A main cylinder chamber 36 is enclosed by the main piston 12 and the main cylinder 10.

In its top dead center illustrated in FIG. 2, the main piston 12 with the main cylinder 10 encloses a minimum main cylinder chamber 36a while the main piston 12 in its bottom dead center illustrated in FIG. 3 encloses with the main cylinder 10 a maximum main cylinder chamber 36b.

Ignition of a hydrogen/air mixture present in the main cylinder chamber 36 is carried out by an ignition element 38.

The main piston 12 is arranged coaxially to a cylinder axis 40 of the main cylinder 10 and moves parallel thereto in the stroke direction 14.

An auxiliary cylinder 42 is linked with the main cylinder 10 and this is arranged coaxially to the cylinder axis 40 and extends away from the main piston 12. An auxiliary piston 44 is mounted for displacement in this auxiliary cylinder 42 and this piston is also arranged coaxially to the cylinder axis 40 and rises above a base 46 of the main piston 12 in the direction of the auxiliary cylinder 42.

The auxiliary piston 44 is preferably held non-displaceably in the stroke direction 14 on the main piston 12 with an auxiliary piston foot 48. This auxiliary piston foot 48 comprises an annular flange 50 which is located in a recess 52 arranged on the base side in the main piston 12 and is held in this recess by a base cover 54 having an opening 56 and an edge region 58 surrounding the opening 56 which engages over the annular flange 50.

The opening 56, through which the auxiliary piston 44, proceeding from its auxiliary piston foot 48, projects beyond the base 48 in the direction of the auxiliary cylinder 42, and the recess 52 are preferably dimensioned such that the auxiliary piston foot 48 has clearance in the radial direction relative to the cylinder axis 40 and so can move to a slight extent in the radial direction relative to the cylinder axis 40 in order to constantly take up a central position relative to the auxiliary piston 44.

In the simplest case, the auxiliary piston 44 is completely cylindrical and the auxiliary cylinder 42 is also designed to be cylindrical to the cylinder axis 40 and extends from an auxiliary cylinder opening 60 in the main cylinder 10 to an auxiliary cylinder head 62 which closes the auxiliary cylinder 42. A hydrogen injector 64 is inserted into the auxiliary cylinder head 62 and this injects hydrogen of, for example, 15 bars, into the auxiliary cylinder 42.

The auxiliary piston 44 forms with the auxiliary cylinder 42 a cylinder chamber 66 which, in the top dead center of the main piston 12, is the minimum cylinder chamber 66a and, in the bottom dead center of the main piston 12, the maximum cylinder chamber 66b.

The cylinder chamber 66 communicates with the main cylinder chamber 36 via a gap 68 formed between the auxiliary piston 44 and the auxiliary cylinder 42, i.e. its cylinder surfaces. This gap is intentionally large in design and represents a transfer passage between the cylinder chamber 66 and the main cylinder chamber 36.

The inventive combustion engine, illustrated in FIGS. 1 and 3, operates as follows:

During a suction stroke the main piston 12 moves together with the auxiliary piston 44 from the top dead center, illustrated in FIG. 2, to the bottom dead center, illustrated in FIG. 3. In this case, the inlet opening 26 is released by the inlet valve 28 so that air can flow into the main cylinder chamber 36 through the inlet passage 24. At the same time, hydrogen at a pressure of approximately 10 to 20 bars is injected into the cylinder chamber 66 via the hydrogen injector 64. Since the gap 68 is very small in dimension, only a very small amount of the hydrogen flows into the main cylinder chamber 36 and so an extremely weak hydrogen/air mixture is formed therein and this is not ignitable.

During a compression stroke the main piston 12 moves together with the auxiliary piston 44 from the bottom dead center, illustrated in FIG. 3, to the top dead center, illustrated in FIG. 2. The increasing compression in the cylinder chamber 66 now results in an increasing amount of the hydrogen flowing from the cylinder chamber 66 via the gap 68 into the main cylinder chamber 36a and increasingly enriching the extremely weak hydrogen/air mixture therein but leaving this so weak over broad regions of the compression stroke that this is not ignitable and the hydrogen/air mixture in the main cylinder chamber 36 is not enriched enough to be ignitable until towards the end of the compression stroke. This means that an ignitable mixture does not result in the main cylinder chamber 36 until shortly before the top dead center is reached and so the mixture formation is comparable with respect to its ignitability to the internal mixture formation having late commencement of injection, i.e. commencement of injection in the vicinity of the top dead center.

This avoids the problem of early ignition occurring in the internal mixture formation with early injection.

Moreover, the displacement of the hydrogen out of the cylinder chamber 66 and the transfer thereof through the gap 68 into the main cylinder chamber 36 causes, in the main cylinder chamber, a very strong turbulence in the hydrogen together with the compressed air and so, consequently, the hydrogen/air mixture is very well mixed locally due to the resulting turbulences.

During the subsequent combustion stroke the main piston 12 and the auxiliary piston 44 non-displaceably connected therewith in the stroke direction 14 move from the top dead center to the bottom dead center while the main cylinder chamber 36 expands and during the subsequent exhaust stroke the combusted hydrogen/air mixture is expelled through the outlet opening 32, with the outlet valve 34 open, via the outlet passage 30.

Subsequently, this combustion engine commences a new cycle of operation.

Figure 4:
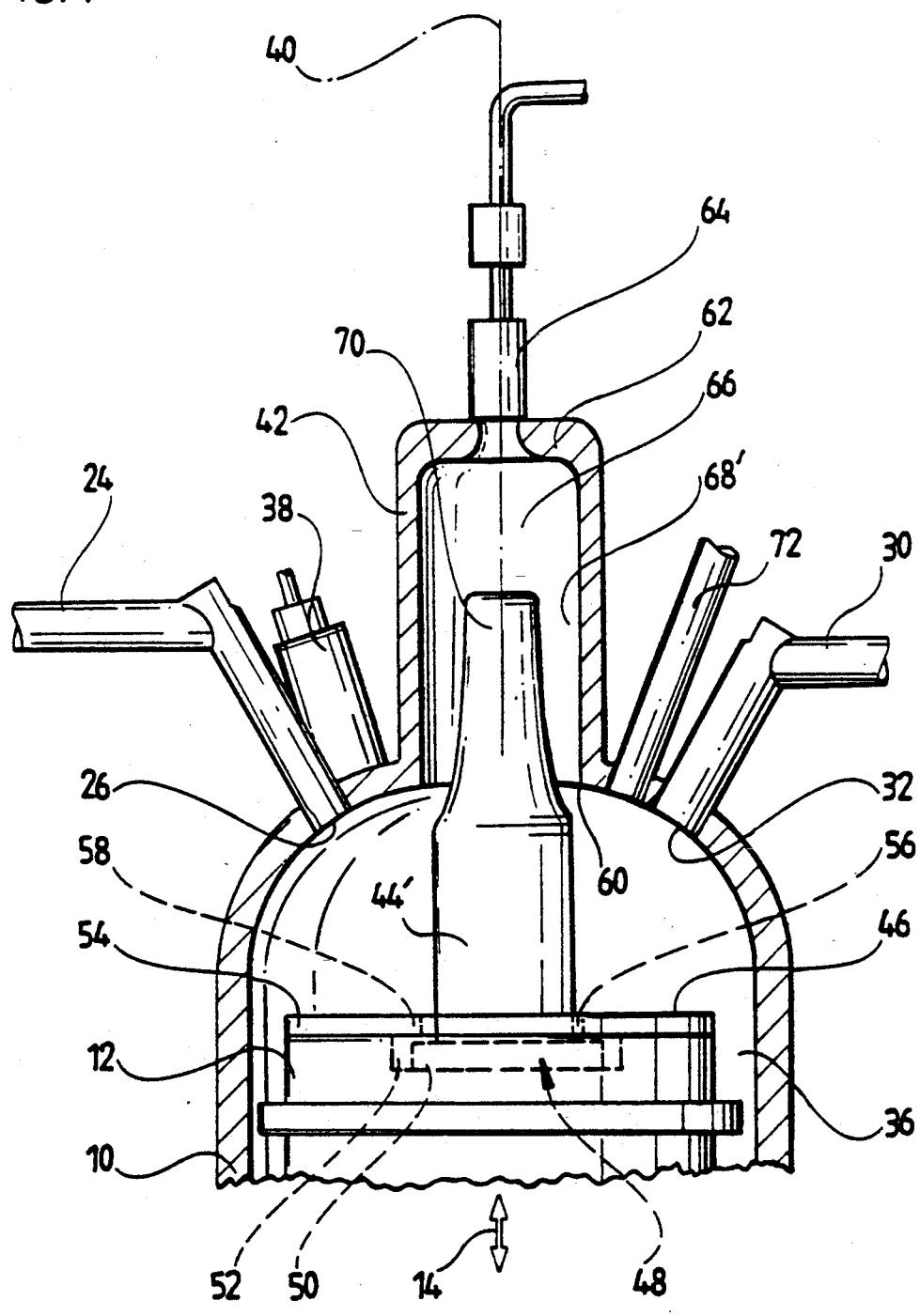

In a second embodiment of the inventive combustion engine, illustrated in FIG. 4, the auxiliary piston 44' is, in contrast to the auxiliary piston 44, not completely cylindrical in design but narrows in its central portion 70 so that the width of the gap 68' formed between the auxiliary cylinder 42 and the auxiliary piston 44' and, therefore, the width of the transfer passage between the cylinder chamber 66 and the main cylinder chamber 36 varies between the top and bottom dead centers according to the position of the auxiliary piston 44'.

For example, the width of the gap 68' is large during a compression stroke, starting from the bottom dead center, and so at the beginning of the compression stroke a slighter volume of hydrogen is displaced out of the auxiliary cylinder 44, although this can easily reach the main cylinder chamber 36 due to the larger width of the gap 68', whereas once the central region 70 has passed through the auxiliary cylinder opening 60 the gap 68' is less wide and so the hydrogen from the cylinder chamber 66 can no longer flow so easily into the main cylinder chamber 36. This means, for example, that at the beginning of the compression stroke the hydrogen can easily be transferred into the main cylinder chamber 36, as long as a hydrogen/air mixture present in the main cylinder chamber is far removed from being capable of igniting, whereas towards the end of the compression stroke, when the hydrogen/air mixture in the main cylinder chamber 36 is close to being ignitable, a lesser amount of hydrogen flows into this chamber and, consequently, the hydrogen/air mixture in the main cylinder chamber 36 will be kept below its ignitability more or less until the top dead center is reached and this ignitability is not reached until more or less immediately before the top dead center.

In addition, the second embodiment is also provided with a main injection means 72 which opens directly into the main cylinder chamber 36 and serves to inject hydrogen directly into the main cylinder chamber during the suction stroke.

This second embodiment operates, in contrast to the first embodiment, such that the major amount of hydrogen is injected via the main injection means 72 during the suction stroke so that a hydrogen/air mixture is already formed in the main cylinder chamber 36, this major amount being determined such that the mixture thus resulting is a weak mixture which has no or only a negligible ignitability.

The remaining hydrogen is, as before, injected into the cylinder chamber 66 via the injector 64 and injected into the main cylinder chamber 36 via the gap 68 during the course of the compression stroke so that the optimum ignitable mixture again does not result until near the end of the compression stroke. Thus, the same advantages can be achieved as with the first embodiment.

The advantage of the second embodiment according to FIG. 4 is to be seen in the fact that the auxiliary cylinder 42 and the auxiliary piston 44 can be of a smaller construction and therefore the entire combustion engine can be built in a more space-saving manner since a smaller amount of hydrogen is injected into the cylinder chamber 66 and from there transferred to the main cylinder chamber 36.

The present disclosure relates to the subject matter disclosed in German application No. P 40 03 729.0 of Feb. 8, 1990, the entire specification of which is incorporated herein by reference.

What is claimed is:

1. Combustion engine for hydrogen comprising a main piston displaceable in a main cylinder in a stroke direction between a top dead center, forming a minimum main cylinder chamber with the main cylinder, and a bottom dead center and hereby performing a suction stroke, a compression stroke, a displacement stroke and an exhaust stroke, characterized in that an auxiliary piston (44) and an auxiliary cylinder (42) are provided for movement relative to one another so as to be in equal phase and synchronous with the main piston (12) and the main cylinder (10), that the auxiliary piston (44) and the auxiliary cylinder (42) define with one another a cylinder chamber (66) varying between a minimum cylinder chamber (66a) in the top dead center and a maximum cylinder chamber (66b) in the bottom dead center, that the minimum cylinder chamber (66a) communicates with the minimum main cylinder chamber (36a) via a passage (68) and that the hydrogen is injected into the cylinder chamber (66) during the course of the suction stroke.

2. Combustion engine as defined in claim 1, characterized in that the passage is at least partially formed by a gap (68) between the auxiliary piston (44) and the auxiliary cylinder (42).

3. Combustion engine as defined in claim 2, characterized in that the smallest radial width of the gap (68) between the auxiliary piston (44) and the auxiliary cylinder (42) varies between the top dead center and the bottom dead center.

4. Combustion engine as defined in claim 1, characterized in that the auxiliary piston (44) and the auxiliary cylinder (42) move relative to one another in the stroke direction (14) of the main piston (12).

5. Combustion engine as defined in claim 1, characterized in that the auxiliary piston (44) and the auxiliary cylinder (42) travel, relative to one another, along the same path as the main piston (12).

6. Combustion engine as defined in claim 1, characterized in that the displaceable auxiliary piston (44) or auxiliary cylinder (42), respectively, is coupled to the main piston (12) via a connecting member (48).

7. Combustion engine as defined in claim 6, characterized in that the stationary auxiliary cylinder (42) or auxiliary piston (44) is rigidly connected to the main cylinder (10) and that the displaceable auxiliary piston (44) or auxiliary cylinder (42), respectively, is held on the main piston (12).

8. Combustion engine as defined in claim 7, characterized in that the auxiliary piston (44) or auxiliary cylinder (42) is held on the main piston (12) with clearance transverse to the stroke direction (14).

9. Combustion engine as defined in claim 7, characterized in that the auxiliary piston (44) rises above a base (46) of the main piston (12).

10. Combustion engine as defined in claim 1, characterized in that the auxiliary cylinder (42) extends away from the minimum cylinder chamber (36a).

11. Combustion engine as defined in claim 10, characterized in that the auxiliary cylinder (42) extends in the stroke direction (14) of the main piston (12).

12. Combustion engine as defined in claim 10, characterized in that the auxiliary cylinder (42) forms an extension of the main cylinder (10).

13. Combustion engine as defined in claim 1, characterized in that the combustion engine is provided with a main injection means (72) opening into the main cylinder chamber (36) and generating a weak mixture during the suction stroke, and that for enriching the mixture an enriching injection means (64) into the cylinder chamber (66) is provided.

* * * * *